United States Patent [19]

Yamashita et al.

[11] Patent Number: 4,985,822

[45] Date of Patent: Jan. 15, 1991

[54] MULTISTATION SWITCH SYSTEM

[75] Inventors: Akira Yamashita; Katsumi Teramoto, both of Tokyo, Japan

[73] Assignee: Kabushiki Kaisha SG, Tokyo, Japan

[21] Appl. No.: 256,698

[22] Filed: Oct. 12, 1988

[51] Int. Cl.$^5$ .............................................. G05B 19/06
[52] U.S. Cl. ................................... 364/142; 364/469; 364/474.11
[58] Field of Search .................... 364/474.11, 469–473, 364/142

[56] References Cited

U.S. PATENT DOCUMENTS

| | | | |
|---|---|---|---|
| 4,007,028 | 2/1977 | Bublitz et al. | 364/142 X |
| 4,510,570 | 4/1985 | Yonekura | 364/142 X |
| 4,835,676 | 5/1989 | Kumar et al. | 364/142 |

FOREIGN PATENT DOCUMENTS 0222306  12/1983  Japan ................... 364/142

Primary Examiner—Clark A. Jablon
Attorney, Agent, or Firm—Spensley Horn Jubas & Lubitz

[57] ABSTRACT

The multistation switch system comprises position detector for detecting current position of a main shaft, programmable switch device provided for each of the stations for receiving position data formed in accordance with output of the position detector and generating, in response to the position data, one or more on/off signals which are predetermined in correspondence to selected position or positions of the main shaft, and start/stop interlock circuit for setting start and stop timings for starting and stopping a switch output in correspondence to the programmable switch device provided for each station. The programmable switch device for each station outputs the on/off signals between the start and stop timings set by the start/stop interlock circuit in correspondence to each station.

13 Claims, 4 Drawing Sheets

MULTISTATION SWITCH SYSTEM

BACKGROUND OF THE INVENTION

This invention relates to a multistation switch system and is applicable to general industrial machines including, for example, an automatic assembling mahcine for print circuit boards or the like, packing machine, bottle making machine, tin making machine and press.

There is a systematized mass production system for producing products in plural production lines in parallel, transferring finished products to a common line in synchronization with one another and palletizing the finished products transferred to the common line. An example of layout of such mass production system is shown in FIG. 2. Individual production lines are designated by reference characters #1 through #n and these production lines will hereinafter be referred to as "stations". In other words, each of the stations #1-#n is an automatized production line which individually produces the products automatically. Arrows X indicate the direction in which semi-finished products are conveyed in the respective stations. Along conveying lines of the respective stations #1-#n are provided actuators or robots (hereinafter referred generally to as "actuators") A1-An at predetermined locations for performing an automatic work.

At the end of the respective stations #1-#n are provided transferring actuators B for transferring the products to a conveyor CVY. An arrow Y indicates the direction in which the products are conveyed on the conveyor CVY. At the end of the conveyor CVY is provided, if necessary, an actuator C for examining quality of the products or other purpose. At the end of the conveyor CVY is also provided a palletizing device PLT. The palletizing device PLT is operated in response to an operation of an actuator D to arrange the products which have been transferred from the conveyor CVY on a pallet P and thereby store these products.

A master device is provided for distributing and supplying materials or parts to the respective stations #1-#n. This master device has a main shaft MS which is driven by an unillustrated motor or like driving means. As this main shaft MS is rotated, materials and parts are distributed and supplied to the respective stations #1-#n. The respective stations #1-#n function as a kind of slave device with respect to the master device. That is, the respective stations #1-#n start their operation and perform various operations in synchronism with the operation of the master device. The operation for conveying semi-finished products in the respective stations #1-#n also is controlled in interlocked relation with the rotation of the main shaft MS. For example, the operation for conveying semi-finished products in the respective stations #1-#n may be performed in mechanically interlocked relation with the rotation of the main shaft MS or, alternatively, the operation for conveying semi-finished products may be performed in interlocked relation with the rotation of the main shaft MS by controlling conveying of the semi-finished products in the respective stations #1-#n in accordance with detected data of the rotational position of the main shaft MS. The conveyor CVY may be driven by independently controlling its running velocity or by controlling the running velocity in interlocked relation with the rotation of the main shaft MS. As the actuators A1-An, B, C and D, those adapted to works in respective processes such as solenoids, cylinders, motors, injectors and blowers are employed.

Take, for example, a process for manufacturing glass bottles. Material is distributed to respective stations #1-#n in interlocked relation with the rotation of the main shaft MS and a series of bottle manufacturing processes including insertion of the material to a rough mold, forming of a bottle by blowing or pressing in the rough mold, finish forming by blowing, annealing and printing are performed in the respective stations #1-#n in parallel with one another. In such production system, the operations of the actuators A1-An, B, C and D of the respective stations #1-#n are respectively controlled at predetermined timing in synchronism with the rotation of the main shaft MS. In the prior art system, a number of cam switches are provided on the main shaft MS for effecting such synchronized control and the operations of the actuators are controlled by outputs of these cam switches. Since, in this system, the operations of the stations #1-#n must be controlled independently from one another, the cam switches corresponding to the respective actuators A1-An, B, C and D must be provided for each of the stations #1-#n.

A mechanical type cam switch is disadvantageous in that change in the operation position of the switch is difficult, that there arises mulfunction in mechanical contact of the switch and that the system becomes complicated and bulky if a large number of mechanical type switched are provided. For eliminating these problems, Japanese Preliminary Patent Publication No. 58-222306 proposes a programmable cam system in which relation between a rotational position sensor for detecting the rotational position of a shaft and a desired switch on/off position is previously programmed and a programmed switch on/off signal is generated in accordance with the rotational position detected by the rotational position sensor. The disadvantages of the conventional mechanical type cam switches can be overcome by employing this programmable cam system.

In employing the above described programmable cam system in a production system having plural stations #1-#n as described above, however, a rotational position sensor and a cam switch data generation device must be provided independently for each station. Further, since works in the respective stations #1-#n must be performed in synchronization with one another at predetermined timing, a sequencer for controlling a cam output timing for each station must be provided above cam switch data generation devices for the respective stations. Particularly, when operations in the respective stations #1-#n are started and stopped at different times and in a predetermined order, a sequential control of timings for starting and stopping the operations in the respective stations is required. In a case where, for example, material is distributed sequentially to respective stations #1-#n in accordance with rotation of the main shaft MS and an operation is started sequentially in the order of the stations to which the material has been distributed, it is necessary to shift timings of starting and stopping the operation for the respective stations because otherwise there would arise inconvenience that actuators would be operated idly without material supplied thereto. Fo these reasons, the prior art programmable cam system requires a sequencer as a supervising device both in hardware and software aspects.

Accordingly, in the prior art system, an electronic type switch system such as the above described programmable cam system must be provided in a production system having plural stations which are independent work lines so that the system tends to become bulky and costly. Besides, the prior art system requires a sequencer as a supervising device controlling interrelation among respective stations so that the system tends to become bulky and costly also in this respect.

SUMMARY OF THE INVENTION

It is, therefore, an object of the invention to provide, in a simple and inexpensive manner, a multistation switch system capable of supplying switch signals for control purposes to plural stations in accordance with position of a main shaft.

The multistation switch system according to the invention is characterized in that it comprises position detection means for detecting current position of the main shaft, programmable switch means provided for each of the stations for receiving position data formed in accordance with output of the position detection means and generating, in response to the position data, one or more on/off signals which are predetermined in correspondence to selected position or positions of the main shaft, and start/stop interlock means for setting start and stop timings for starting and stopping a switch output in correspondence to the programmable switch means provided for each station, the programmable switch means for each station outputting the on/off signals between the start and stop timings set by the start/stop interlock means in correspondence to each station.

The programmable switch means is provided independently for each station but the position detection means is utilized commonly for the respective stations. That is, position data formed on the output of the common position detection means is applied to the programmable switch means for each station. The programmable switch means for each station generates, in accordance with this position data, one or more on/off signals preset in correspondence to selected positions of the main shaft. The start/stop interlock means establishes relation between start and stop timings of the switch output by means of, e.g., function of position or time in correspondence to each station. The programmable switch means for each station outputs the on/off signals during time between the start and stop timings set by the start/stop interlock means in correspondence to each station. By the provision of the start/stop interlock means, timings of starting and stopping operations among the programmable switch means for the repsective stages can be controlled.

Accordingly, according to the invention, the necessity for providing separate position detection means for the respective stations and a sequencer as a supervising device is obviated so that the structure of the system is simplified and the manufacturing cost is reduced.

A preferred embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1A:
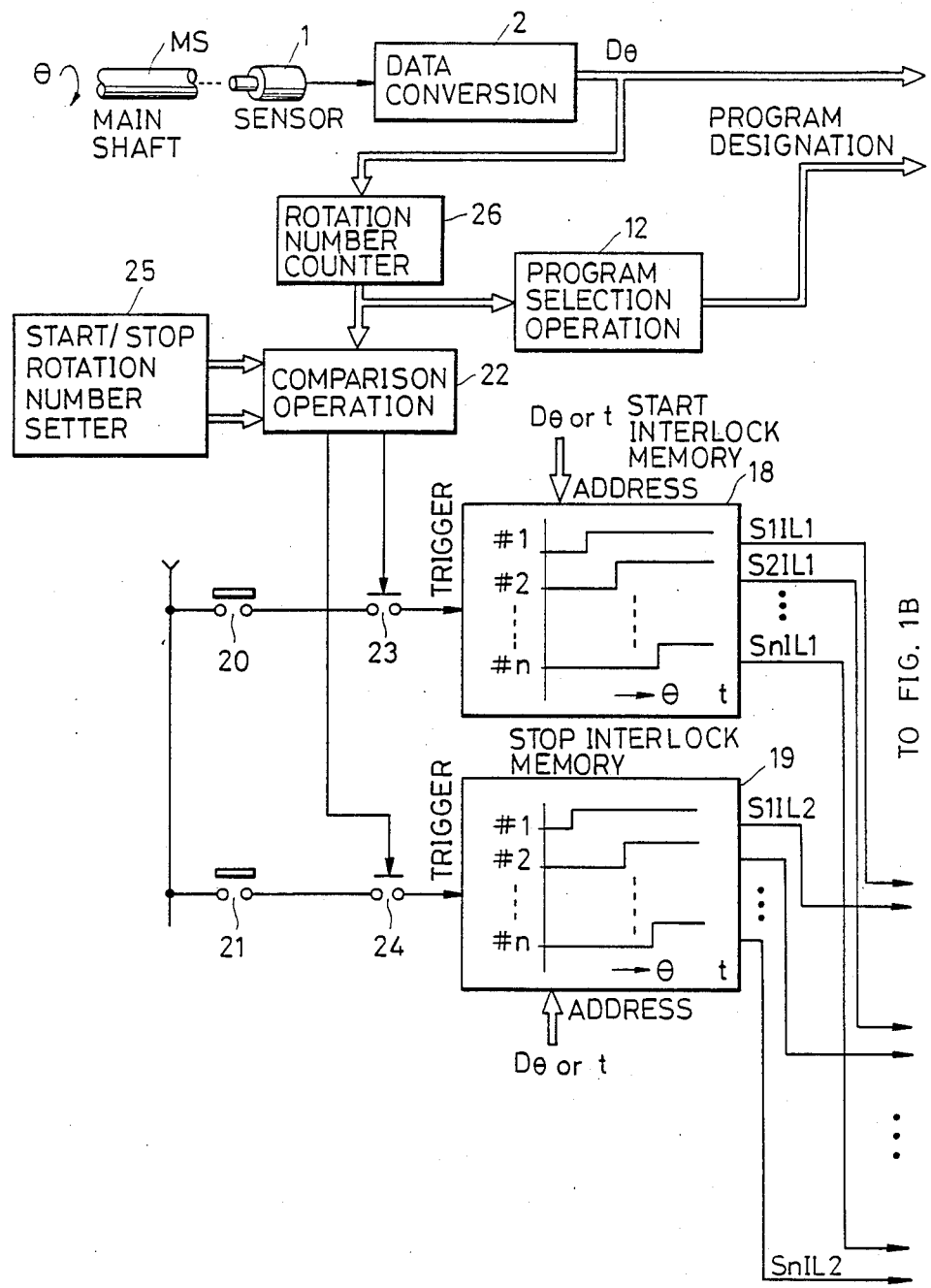
FIGS. 1A and 1B are block diagrams showing an embodiment of the invention.
Figure 1B:
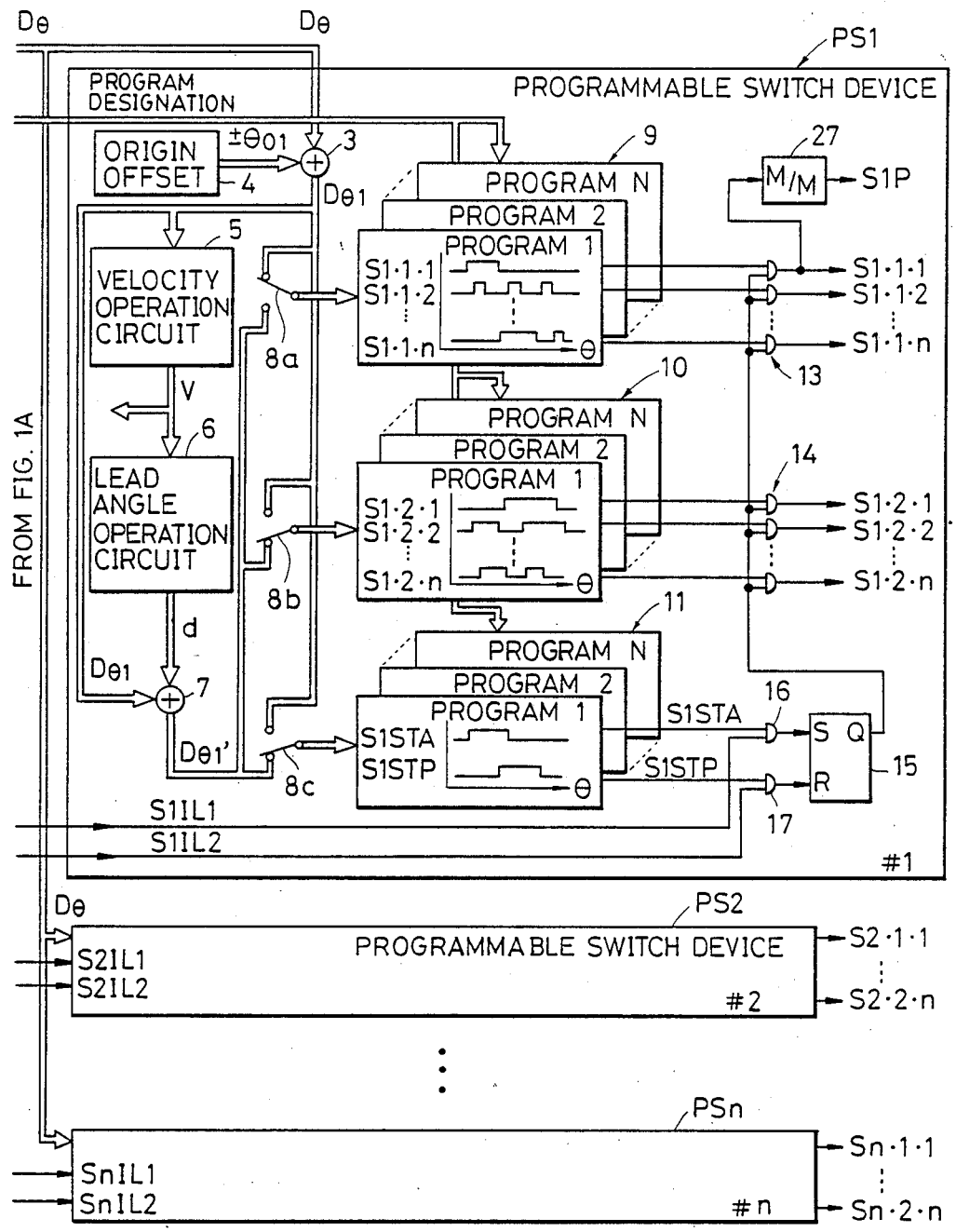

A whole block diagram of an embodiment of the multistation switch system according to the invention is completed by joining the left side of FIG. 1A and the right side of FIG. 1B.

In FIG. 1A, a sensor section 1 and a data conversion circuit 2 constitutes position detection means for detecting rotational position of a main shaft MS. The sensor section 1 is mounted on the main shaft MS and generates an output signal corresponding to the rotation of the main shaft MS. The data conversion circuit 2 receives the output signal of the sensor section 1 and outputs digial data $D\theta$ representing the rotational position of the main shaft MS. This digital data $D\theta$ shows the rotational position (i.e., rotation angle $\theta$) in one rotation of the main shaft MS in absolute value.

Programmable switch devices PS1–PSn are provided in correspondence to the respective stations #1–#n (FIG. 1B). An example of internal construction of the programmable switch device PS1 corresponding to the station #1 only is illustrated but the other programmable switch devices PS2–PSn corresponding to the stations #2–#n may be of the same construction. The rotational position data $D\theta$ of the main shaft MS provided by the data conversion circuit 2 is applied to the programmable switch devices PS1–PSn.

Referring to FIG. 1B, description will be made about the programmable switch device PS1 for the station #1 as representing the programmable switch devices PS1–PSn. The rotational position data $D\theta$ is applied to an adder 3 for origin offsetting in which origin offset data $\pm\theta_{01}$ supplied from an origin offset setter 4 is added thereto or subtracted therefrom. This origin offset processing is a processing for setting an offset amount of the origin of a cam switch of the station #1 (i.e., an origin of a hypothetical cam shaft) from the origin of the main shaft MS. By adding or subtracting the origin offset data $\pm\theta_{01}$ representing a desired origin offset to or from the rotational position data $D\theta$ representing current position of the main shaft MS, rotational position data $D\theta_1$ ($D\theta_1 \times D\theta \pm \theta_{01}$) corresponding to the origin offset of the cam switch for this station #1 can be obtained. The origin offset setter 4 is provided individually for each of the stations #1–#n. In the programmable switch devices PS1–PSn corresponding to the respective stations #1–#n, therefore, origin offset processings of different contents can be made. Alternatively stated, the origin of the main shaft MS concerning the stations #1–#n can be offset from one another in appearance. This means that, if on/off signal generation programs of the same contents are used in different stations, timing of on/off signals generated in the respective stations differs with a phase corresponding to difference in the origin offset amount. Accordingly, the provision of the independent origin offset setters 4 for the respective stations #1–#n is advantageous in that despite the common sensor section 1 is used, the adjustment of origin can be individually effected as if separate sensor sections were mounted in combination on the main shaft MS.

Although not illustrated in the figure, a display may be provided for visually displaying, if necessary, the rotational position data $D\theta$ before origin offsetting and the rotational position data $D\theta_1$ after origin offsetting so that the origin offset setting can be made in a desired manner while contents of the rotational position data $D\theta_1$ under the origin offset adjustment can be confirmed. The origin offset setter 4 includes a numerical data setter.

A velocity operation circuit 5 receives the rotational position data $D\theta_1$ and computes moving velocity V of the main shaft MS on the basis of change in the rotational position data $D\theta_1$ per unit time. The computed velocity data V is applied to a lead angle operation circuit 6. The velocity data V may also be delivered out for utilization for synchronizing the velocity of the conveyor CVY (FIG. 2) or other component part with the velocity of the main shaft MS.

A lead angle operation circuit 6 generates lead angle data d corresponding to the velocity and includes, for example, a table storing lead angle data d for each velocity. The lead angle data d generated in response to the velocity data V is applied to an adder 7 in which it is added to the rotational position data $D\theta_1$ supplied from the adder 3.

The rotational position data $D\theta_1$ provided by the adder 3 and the rotational position data $D\theta_1'$ provided by the adder 7 which has been controlled in its lead angle are applied to on/off signal memories 9 and 10 and a start/stop timing memory 11 through switches 8a, 8b and 8c. The switches 8a, 8b and 8c are provided for selecting the lead angle control and can select presence or absence of the lead angle control independently from one another. In the case of the illustrated embodiment, the switch 8a selects rotational position data $D\theta_1$ which has no lead angle and applies it to the on/off signal memory 9, the switch 8b selects rotational position data $D\theta_1'$ having a lead angle and applies it to the on/off signal memory 10 and the switch 8c selects rotational position data $D\theta_1'$ having a lead angle and applies it to the start/stop timing memory 11. Upon changing over of the switches 8a, 8b and 8c to positions opposite to those illustrated, the switch 8a selects the rotational position data $D\theta_1'$ having a lead angle and applies it to the on/off signal memory 9, the switch 8b selects the rotational position data $D\theta_1$ having no lead angle and applies it to the on/off signal memory 10 and the switch 8c selects the rotational position data $D\theta_1$ having no lead angle and applies it to the start/stop timing memory 11.

The on/off signal memory 9 generates on/off signals S1.1.1, S1.1.2–S1.1.n corresponding to plural cam switches in parallel in response to the rotational position data $D\theta_1$ or $D\theta_1'$ supplied through the switch 8a. These on/off signals S1.1.1, S1.1.2–S1.1.n are set as desired and stored so that they are switched to on state or off state at a desired rotation angle position by unillustrated programming means.

The on/off signal memory 10 likewise generates on/off signals S1.2.1, S1.2.2–S1.2.n in parallel in response to the rotational position data $D\theta_1$ or $D\theta_1'$ supplied through the switch 8b. These on/off signals S1.2.1, S1.2.2–S1.2.n are also set as desired and stored so that they are switched to on state or off state at a desired rotation angle position by unillustrated program means.

The start/stop timing memory 11 generates a start timing signal SISTA corresponding to a switch operation start timing in one rotation and a stop timing signal SISTP corresponding to a switch operation stop timing in one rotation in parallel in response to the rotational position data $D\theta_1$ or $D\theta_1'$ supplied through the switch 8c. These start timing signal SISTA and stop timing signal SISTP are also set as desired and stored so that they are switched to "1" or "0" at a desired rotation angle position by unillustrated programming means.

The memories 9, 10 and 11 store not only the cam switch on/off output program in one rotation but plural programs 1–N over plural rotations whereby cam switch on/off outputs which are programmable over plural rotations are produced. For example, the programs 1–N correspond to rotation numbers of the main shaft MS and one of the cam switch on/off output programs (one of 1–N) corresponding to a rotation number at a particular time is selected by an output of a program selection operation circuit 12. On/off signals S1.1.1, S1.1.2–S1.1.n and S1.2.1, S1.2.2–S1.2.n, start timing signal SISTA and stop timing signal SISTO in the selected program are read out in parallel in response to the rotational position data $D\theta_1$ or $D\theta_1'$.

The on/off signals S1.1.1, S1.1.2–S1.1.n and S1.2.1, S1.2.2–S1.2.n read out from the on/off signal memories 9 and 10 are gated by AND gates 13 and 14. The AND gates 13 and 14 are controlled by output of a flip-flop 15. The start timing signal SISTA read out from the start/stop timing memory 11 is supplied to a set input of the flip-flop 15 through an AND gate 16 and the stop timing signal SISTP is supplied to a reset input of the flip-flop 15 through an AND gate 17. To the other input of the AND gate 16 is supplied a start interlock signal S1IL1 provided by a start interlock memory 18 (FIG. 1A). To the other input of the AND gate 17 is supplied a stop interlock signal S1IL2 provided by a stop interlock memory 19 (FIG. 1A).

Reverting to FIG. 1A, the start interlock memory 18 stores data setting interrelation among the respective stations concerning timing of starting switch operations in the form of a function of position or time and reads out this data in response to the position data $D\theta$ or time data t to provide start interlock signals S1IL1–SnIL1 for each station.

The stop interlock memory 19 stores data setting interrelation among the respective stations concerning timing of stopping switch operations in the form of a function of position or time and reads out this data in response to the position data $D\theta$ or time data t to provide stop interlock signals S1IL2–SnIL2 for each station.

The start interlock signals S1IL1–SnIL1 are signals which rise, for example, to a signal "1" at the switch operation start timing and sustains the state "1" thereafter. The stop interlock signals S1IL2–SnIL2 are signals which rise, for example, to a signal "1" at the switch operation stop timing and sustains the state "1" thereafter. The switch operation start timing and the switch operation stop timing designated by the start interlock signals S1IL1–SnIL1 and stop interlock signals S1IL2–SnIL2 are absolute timings in the whole process of the work whereas the above mentioned start timing signal SISTA and stop timing signal SISTP are relative start and stop timings in one rotation.

The start interlock signals S1IL1–SnIL1 and stop interlock signals S1IL2–SnIL2 are signals based on the start timing or stop timing of, e.g., station #1. Respective signals are programmed in accordance with desired shifts of start timing or stop timing in the other stations #2–#n from the start timing or stop timing in the station #1. Contents of these start interlock signals S1IL1–SnIL1 and stop interlock signals S1IL2–SnIL2 can be programmed as desired.

The start interlock memory 18 and the stop interlock memory 19 provide the start interlock signal S1IL1 or stop interlock signal S1IL2 corresponding to the station #1 in response to a trigger input and thereafter provide the start interlock signals S2IL1–SnIL1 or stop interlock signals S2IL2–SnIL2 for the other stations #2–#n in accordance with change in the rotational position or lapse of time. In a case where these start interlock signals S2IL1–SnIL1 or stop interlock signals S2IL2–SnIL2 are read out in accordance with the rotational position, the rotational position data D$\theta$ is applied to address inputs of the memories 18 and 19. In a case where the start interlock signals S2IL1–SnIL1 or stop interlock signals S2IL2–SnIL2 are read out in accordance with lapse of time, time data t is applied to the address inputs of the memories of 18 and 19.

The trigger signal to the memories 18 and 19 may be formed by a suitable method according to necessity. In the present embodiment, limit switches 20 and 21 such as photo-electric switches provided outside are inserted in a trigger signal forming circuit and, further, electronic switches 23 and 24 controlled by output of a comparison operation circuit 22 are inserted in the trigger signal forming circuit. The limit switches 20 and 21 are turned on when external conditions for starting or stopping switch operations of the entire switch system have been satisfied. The electronic switches 23 and 24 are turned on when the rotation number of the main shaft MS has reached a start rotation number or stop rotation number set by a start/stop rotation number setter 25. In compliance with requirement of production management, the start/stop rotation number setter 25 sets the timing for starting the switch operation of the entire switch system in accordance with the rotation number (start rotation number) of the main shaft MS and also sets the timing for stopping the switch operation of the entire switch system in accordance with the rotation number (stop rotation number) of the main shaft MS. More specifically, by setting the rotation number of the main shaft MS when the production has started as the start rotation number and setting the rotation number of the main shaft MS when the production has stopped as the stop rotation number, total of products produced during time between these rotation numbers in the respective stations can be treated as the total number of products. The limit switch 20 is turned on when, for example, material has been placed at a predetermined start position thereby providing safety condition for generating a start trigger. The limit switch 21 is turned on when, for example, the product is placed at a predetermined stop position thereby providing safety condition for generating a stop trigger. The means for generating trigger signals for the memories 18 and 19 is not limited to the above described combination of the limit switches 20 and 21 and the electronic switches 23 and 24 but other suitable means may be employed. The means for setting the trigger signal generation coditions such as the limit switches 20 and 21 and the electronic switches 23 and 24 may be provided for each station. In this case, however, the circuit construction will become more complicated than the illustrated structure.

The rotation number of the main shaft MS is counted by the rotation number counter 26 in accordance with the rotational position data D$\theta$. Since the rotational position data D$\theta$ represents absolute rotational position in one rotation, a period of time during which this rotational position data D$\theta$ varies from minimum value to maximum value is counted as one count representing one rotation and the rotation number of the main shaft MS from the origin is counted in this manner. Rotation number count data obtained by the counter 26 is applied to the comparison and operation circuit 22 in which it is compared with the start rotation number and stop rotation number set by the start/stop rotation number setter 25. When the counted rotation number of the main shaft MS has reached the set start rotation number, a signal for turning on the electronic switch 23 is supplied to the switch 23 whereas when the counted rotation number of the main shaft MS has reached the set stop rotation number, a signal for turning on the electronic switch 24 is supplied to the switch 24.

When the trigger signal generation condition has been satisfied in the foregoing manner by the switches 20 and 23, a trigger signal is supplied to the start interlock memory 18 and the start interlock signal S1IL1 corresponding to the station #1 is read out. Thereafter, in accordance with change in the rotational position or lapse of time, the start interlock signals S1IL1–SnIL1 are read out. As described previously, the start interlock signal S1IL1 of the station #1 is applied to the AND gate 16 in the programmable switch device PS1 corresponding to the station #1. The start interlock signals S2IL1–SnIL1 of the other stations #2–#n are applied to similar AND gates 16 of corresponding programmable switch devices PS2–PSn.

The AND gate 16 is enabled by the state "1" of the start interlock signal S1IL1 and provides an output signal "1" when the start timing signal SISTA is read out from the memory 11. The flip-flop 15 is set by this output signal "1" of the AND gate 16. The AND gates 13 and 14 are enabled by the set output "1" of the flip-flop 15 so that the on/off signals S1.1.1, S1.1.2–S1.1.$n$, S1.2.1, S1.2.2–S1.2.$n$ read out from the memories 9 and 10 are provided by the programmable switch device PS1.

On the other hand, when the trigger signal generation condition has been satisfied by the switches 21 and 24, a trigger signal is supplied to the stop interlock memory 19 and the stop interlock signal S1IL2 corresponding to the station #1 is read out. Thereafter, in accordance with change in the rotational position or lapse of time, the stop interlock signals S2IL2–SnIL2 for the other stations #2–#n are read out. As described previously, the stop interlock signal S1IL2 for the station #1 is applied to the AND gate 17 in the corresponding programmable switch device PS1. The stop interlock signals S2IL2–SnIL2 for the other stations #2–#n are respectively applied to similar AND gates 17 of corresponding programmable switch devices PS2–PSn.

The AND gate 17 is enabled by the state "1" of the stop interlock signal S1IL2 and produces "1" when the stop timing signal SISTP has been read out from the memory 11. By the output signal "1" of the AND gate 17, the flip-flop 15 is reset. The set output of the flip-flop 15 becomes "0" so that the AND gates 13 and 14 are closed and outputting of the on/off signals S1.1.1, S1.1.2-S1.1.n and S1.2.1, S1.2.2-S1.2.n thereby is prohibited.

Thus, the on/off signals S1.1.1, S1.1.2-S1.1.n and S1.2.1, S1.2.2-S1.2.n are provided during a period of time between the start timing and the stop timing set in correspondence to the station #1 by the start/stop interlock memories 18 and 19. A monostable multivibrator 27 generates a pulse S1P of a trigger type having a predetermined time width in synchronism with rising of the on/off signal S1.1.1. This trigger type cam switch output pulse S1P is utilized as necessity arises. The on/off signals S1.1.1, S1.12-S1.1.n and S1.2.1, S1.2.2-S1.2.n and the pulse S1P are supplied to corresponding ones of the actuators A1-An and B of the station #1 and utilized therein as the on/off operation control signals. Conditions for the channel of the output on/off signals S1.1.1, S1.1.2-S1.1.n of the memory 9 and conditions for the channel of the output on/off signals S1.2.1, S1.2.2-S1.2.n of the memory 10 can be set independently by the switches 8a and 8b with respect to presence or absence of lead angle. Accordingly, in controlling the actuators A1-An and B, the two channels can be controlled separately depending upon whether the lead angle control is performed or not. In other words, the lead angle control can be made for all of the actuators A1-An and B or the lead angle control may not be made with respect to any of the actuators A1-An and B or the lead angle control may be made with respect to the actuators of either channel corresponding to the memory 9 or memory 10 among the actuators A1-An and B.

The rotation number count data obtained by the rotation number counter 26 is applied to the program selection operation circuit 12. The program selection operation circuit 12 generates data designating selection of either one of the cam switch on/off output programs 1-N in accordance with the rotation number. The circuit 12 is adapted, for example, to designate selection of one of the programs 1-N in correspondence to the rotation number of the main shaft MS from the first rotation to the N-th rotation. By such arrangement, the pattern of generation of the on/off signals S1.1.1, S1.1.2-S1.1n and S1.2.1, S1.2.2-S1.2.n can be made to differ depending upon the respective rotation numbers of the main shaft MS whereby a multirotation cam switch function can be realized. The programs 1-N need not be changed at each rotation but the programs may be changed every plural rotatons of the main shaft MS.

Figure 2:
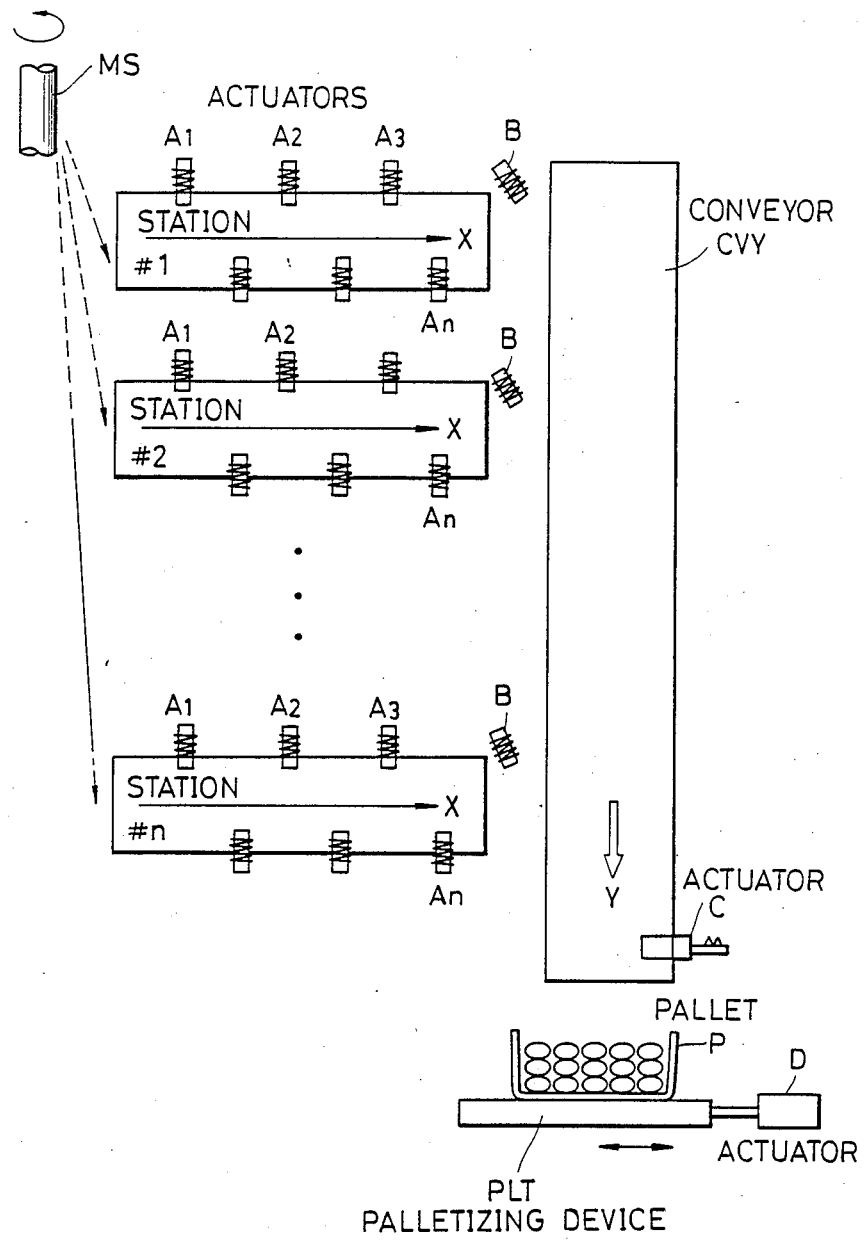
FIG. 2 is a production line layout diagram showing schematically an example of a control system to which the present invention is applied.

For example, the actuators C and D in FIG. 2 may be operated each time the main shaft MS has been rotated by plural rotations. In such case, the above described multirotation cam switch function is effective.

Figure 3:
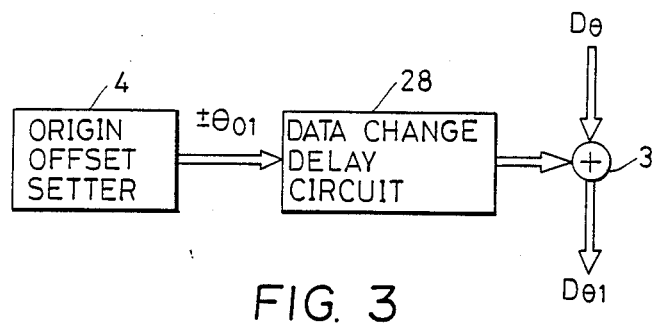
FIG. 3 is a block diagram showing a modified example of a portion relating to an origin offset setter in FIG. 1B.
Figure 4:
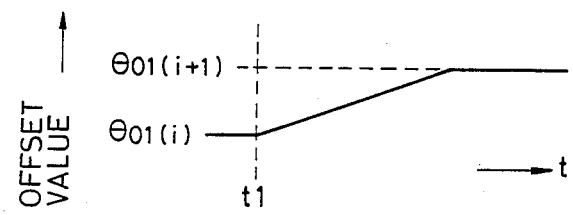
FIG. 4 is a graph showing an example of operation of a data change delay circuit in FIG. 3.

FIG. 3 shows a modified example of the portion of the origin offset setter 4 in FIG. 1. In this example, a data change delay circuit 28 is provided between the origin offset setter 4 and the adder 3. When set contents of origin offset data $\pm\theta_{01}$ in the origin offset setter 4 have been changed, the data change delay circuit 28 transmits the change to the adder 3 after gradually changing the contents instead of transmitting the change directly. More specifically, as shown in FIG. 4, when the origin offset data set by the origin offset setter 4 has changed from $\theta_{01}(i)$ to $\theta_{01}(i+1)$, the data is changed gradually with a suitable function of time $\theta(t)$ from the data $\theta_{01}(i)$ before the change to the data $\theta_{01}(i+1)$ after the change. It becomes sometimes necessary to adjust the origin offset amount by changing the setting of the origin offset setter 4 during operation of the mahcine. In such case, it would be dangerous if the on/off signal output is changed abruptly by change of the origin offset amount with resulting sudden starting of operation of an actuator. For preventing such danger, it is preferable, when the set contents of the origin offset data $\pm\theta_{01}$ in the origin offset setter 4 have been changed as shown in FIG. 3, to transmit this change after effecting gradual change without transmitting it directly to the adder 3.

Figures 5, 6:
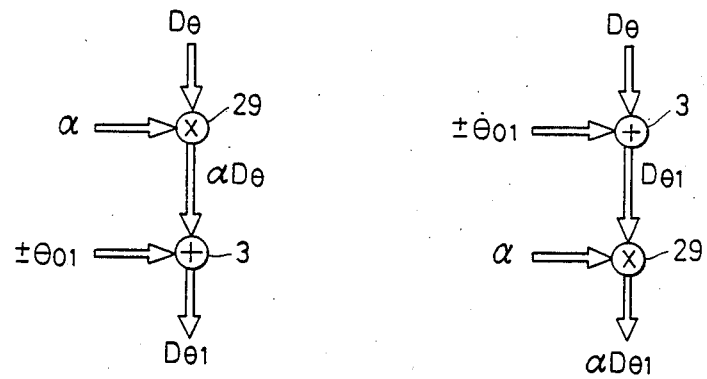
FIG. 5 is a block diagram showing a modified example of a portion relating to an adder for changing rotational position data in FIG. 1.
FIG. 6 is a block diagram showing another modified example of the portion relating to the adder for changing rotational position data in FIG. 1.

FIG. 5 shows a modified example of the portion relating to the adder 3 in FIG. 1. In this example, the rotational position data $D\theta$ is multiplied by $\alpha$ at a ratio corresponding to a coefficient $\alpha$ by a multiplier 29 before the rotational position data $D\theta$ is applied to the adder 3 and the origin offset data $\pm\theta_{01}$ is added to this rotational position data $D\theta$. It is assumed that the bit number of the data $\alpha D\theta$ is the same as the data $D\theta$ and, therefore, when the value of the data $D\theta$ has exceeded maximum value M of the data $D\theta$ (value of one roation), the value of the data $\alpha D\theta$ becomes a value left after subtracting $n \times M$ (where n is an integer of 1 or more). In other words, it is assumed that the data $\alpha D\theta$ is data of modulo M which is the same as the data $D\theta$. This means that rotational position data obtained when a rotational position of an output shaft has been detected through a gear with a transmission ratio of $1:\alpha$ relative to the main shaft MS is equivalent to the data $\alpha D\theta$. By reading out the on/off signals of the memories 9, 10 and 11 in response to the rotational position data $\alpha D\theta$ which has been multiplied by $\alpha$, a switch on/off signal generated in a case where the shaft of a station (hypothetical cam shaft) has been rotated by $\alpha$ rotations for one rotation of the main shaft MS can be read out. The value of the coefficient $\alpha$ applied to the multiplier 29 can be set as desired whereby a situation in which the transmission ratio of the station shaft to the main shaft MS needs to be changed to $1:\alpha$ can be coped with without changing the contents of the memories 9, 10 and 11. The coefficient $\alpha$ may either be an integer or fraction. The multiplier 29 may be provided on the output side of the adder 3 as shown in FIG. 6. In the case of FIGS. 5 and 6, the origin offset data $\pm\theta_{01}$ may be or may not transmitted through the data change delay circuit 28.

For back-up purposes, data programmed in the memobries 9, 10, 11, 18 and 19 may be transferred to a suitable external memory and stored therein by unillustrated programming means. In that case, an IC card or like device may be employed as the external memory.

As the rotational position detection means consisting of the sensor section 1 and the data conversion circuit 2, the phase shift type absolute rotatinal position detector disclosed in Japanese Preliminary Patent Publication No. 57-70406 may conveniently be employed for accurate position detection. In that case, the sensor section 1 consists of a variable reluctance type sensor having a stator having primary and secondary coils wound about plural poles and a rotor of a predetermined configuration (e.g., offset configuration) made of magnetic substance or conducting substance and the data conversion circuit 2 consists of a circuit which supplies plural ac signals of different phases to respective primary coils of the sensor and measures phase difference of a secondary coil output signal from a reference ac signal. Alternatively, an incremental encoder may be employed as the sensor section 1 and a circuit which counts incremental pulses for obtaining position data may be employed as the data conversion circuit 2.

As the programmable switch devices PS1-PSn may be employed a device as disclosed in Japanese Preliminary Patent Publication No. 58-222306 in which signals "1" and "0" corresponding to on and off states are stored in a memory using rotational position as address and these signals are read out in response to rotational position data. Alternatively, the programmable switch devices may be devices in which set position data of switch-on and set position data of switch-off are stored in a memory, these data are compared with rotational position data and signals "1" and "0" corresponding to the on and off states are formed and provided in accordance with result of this comparison.

As the position detection means, not only a device detecting rotation of the main shaft but a device detecting linear displacement of an object which displaces linearly in response to rotation of the main shaft may be employed.

As described above, according to the invention, the position detection means is used commonly by the respective stations though the programmable switch means are provided independently for the respective stations so that the construction of the system can be simplified and the manufacturing cost can be reduced. Further, by providing the start/stop interlock means for setting relation of start timing and stop timing of switch operation among the respective programmable switch means by a function of position or time, on/off signals for control purposes can be generated independently station by station while keeping operations of the repsective stations in associated relationship with one another without providing a sequencer as a supervising device in a control system having plural work stations each performing a series of work by operation of one or more operation means and controlling the operation by the operation means in each station in accordance with position of a main shaft independently for each station. Accordingly, in this aspect also, the construction of the system can be simplified and the manufacturing cost can be reduced.

What is claimed is:

1. A multistation switch system in a control system having plural work stations each performing a series of work by operation of one or more operation means and controlling the operation by said operation means in each station in accordance with position of a main shaft independently for each station, said multistation switch system generating on/off signals for controlling operations in the respective stations in accordance with the position of said main shaft characterized in that said multistation switch system comprises:
   position detection means for detecting current position of said main shaft;
   programmable switch means provided for each of said stations for receiving position data formed in accordance with output of said position detection means and generating, in response to said position data, one or more on/off signals which are predetermined in correspondence to selected position or positions of the main shaft; and
   start/stop interlock means for setting start and stop timings for starting and stopping a switch output in correspondence to said programmable switch means provided for each station,
   said programmable switch means for each station outputting the on/off signals between the start and stop timings set by said start/stop interlock means in correspondence to each station.

2. A multistation switch system as defined in claim 1 wherein said position detection means detects rotational position of the main shaft, said start/stop interlock means sets the start and stop timings of the switch output in a range of plural rotations of the main shaft, said programmable switch means for each station respectively comprises start/stop timing setting means for setting start and stop timings of a switch output within one rotation in each station and controls outputting of the on/off signals on conditions that the start or stop timing set by said start/stop interlock means in correspondence to said programmable switch means has arrived and that the start or stop timing set by said start/stop timing setting means has arrived.

3. A multistation switch system as defined in claim 1 wherein said programmable switch means for each station comprises origin offset means for offsetting value of position data formed on the basis of the output of said position detection means in accordance with an origin offset value which can be set independently for each station and generates the predetermined one or more on/off signals in accordance with the origin-offset position data.

4. A multistation switch system as defined in claim 3 wherein said origin offset means comprises data change delay means for changing the origin offset value gradually from data before the change to data after the change when the orign offset value has been changed.

5. A multistation switch system as defined in claim 1 wherein said programmable switch means for each station comprises means for changing the value of the position data formed on the basis of the output of said position detection means at a rate corresponding to a coefficient which can be set independently for each station.

6. A multistation switching system for controlling a plurality of work stations comprising the combination of:
   a master device for assuming different positions;
   a position detector for determining the position of the master device;
   a different programmable switch device associated with each of the plurality of work stations and responsive to the position detector for producing output signals therefrom to control operation of the associated station independently of the other stations; and
   a common start/stop interlock device for controlling the output signals produced by each of the different programmable switch devices independently of the other programmable switch devices.

7. The invention set forth in claim 6, wherein the start/stop interlock device includes a start interlock memory to provide start interlock signals to each of the different programmable switch devices and a stop interlock memory to provide stop interlock signals to each of the different programmable switch devices.

8. The invention set forth in claim 7, further including a time lapse detector for detecting time lapse following commencement of an initial movement of the master device, and wherein the start interlock memory and the stop interlock memory are responsive to the position detector and to the time lapse detector.

9. The invention set forth in claim 6, wherein the master device comprises a rotating device and the start/stop interlock device is responsive to a signal from the position detector representing absolute rotation position in one rotation of the master device.

10. The invention set forth in claim 6, wherein each of the different programmable switch devices includes at least one gate for providing output signals therefrom, the at least one gate being coupled to be controlled by the start/stop interlock device.

11. The invention set forth in claim 10, wherein each of the different programmable switch devices includes a plurality of AND gates for providing output signals therefrom, a flip flop for controlling the plurality of AND gates and a start/stop timing memory, the flip flop being responsive to the start/stop timing memory and to the start/stop interlock device.

12. The invention set forth in claim 11, wherein each of the different programmable switch means includes at least one on/off signal memory for providing output signals to the plurality of AND gates.

13. The invention set forth in claim 6, wherein the master device comprises a rotating device, the position detector generates a signal representing the rotational position of the rotating device, and each of the different programmable switch devices includes at least one on/off signal memory for storing on/off signals as a function of rotational position of the rotating device and operative to provide the on/off signals as output signals when the rotational position of the rotating device as represented by the position detector corresponds to the on/off signals stored in the on/off signal memory.

* * * * *